US012659424B2

(12) United States Patent　　(10) Patent No.:　US 12,659,424 B2
Delaney et al.　　　　　　　　　(45) Date of Patent:　　Jun. 16, 2026

(54) COMPUTING DEVICE WITH ADJUSTABLE CAMERA

(71) Applicant: LENOVO (SINGAPORE) PTE. LTD, Singapore (SG)

(72) Inventors: Mark Delaney, Raleigh, NC (US); Nathan Peterson, Oxford, NC (US); Russell Speight Vanblon, Raleigh, NC (US); Arnold Weksler, Raleigh, NC (US); John C Mese, Cary, NC (US)

(73) Assignee: LENOVO (SINGAPORE) PTE. LTD, Singapore (SG)

( * ) Notice: Subject to any disclaimer, the term of this patent is extended or adjusted under 35 U.S.C. 154(b) by 480 days.

(21) Appl. No.: 17/561,413

(22) Filed: Dec. 23, 2021

(65) Prior Publication Data

US 2023/0209013 A1　　Jun. 29, 2023

(51) Int. Cl.
　　*H04N 7/14*　　　　(2006.01)
　　*G03B 17/56*　　　(2021.01)
　　*G06F 1/16*　　　　(2006.01)
　　*H04N 23/611*　　(2023.01)
(52) U.S. Cl.
　　CPC ........... *H04N 7/144* (2013.01); *G03B 17/561* (2013.01); *G06F 1/1686* (2013.01); *H04N 23/611* (2023.01)

(58) Field of Classification Search
　　CPC ...... G16H 40/63; G16H 10/65; G02B 27/017; B65D 83/525; H04N 7/14; H04N 23/611; G06F 1/16; G03B 17/56
　　USPC .......................... 348/73, 139, 151, 208.3, 373
　　See application file for complete search history.

(56) References Cited

U.S. PATENT DOCUMENTS

| | | | | |
|---|---|---|---|---|
| 5,687,939 | A * | 11/1997 | Moscovitch ........... | F16M 11/24 361/679.04 |
| 9,485,414 | B2 * | 11/2016 | Visosky ................. | H04N 23/50 |
| 2015/0264295 | A1 * | 9/2015 | Hundemer ........... | H04N 21/854 386/230 |
| 2017/0123463 | A1 * | 5/2017 | Douglas ................. | H04N 23/55 |
| 2017/0171528 | A1 | 6/2017 | Ent et al. | |
| 2018/0295328 | A1 * | 10/2018 | Tucker ................... | H04N 7/183 |
| 2021/0199956 | A1 | 7/2021 | Stewart et al. | |
| 2023/0022108 | A1 * | 1/2023 | Ghosh ................... | G06T 15/506 |

* cited by examiner

*Primary Examiner* — Yosef K Laekemariam
(74) *Attorney, Agent, or Firm* — Brian J. Pangrle

(57)　　　　　ABSTRACT

A device can include a processor; memory accessible to the processor; a housing that includes a bezel, a display operatively coupled to the processor, an adjustable extension recess and an adjustable extension extendible outwardly from the bezel and the display; and a camera mountable to the adjustable extension.

19 Claims, 15 Drawing Sheets

Method 1200

Method <u>1300</u>

COMPUTING DEVICE WITH ADJUSTABLE CAMERA

TECHNICAL FIELD

Subject matter disclosed herein generally relates to technology for computing devices or other devices.

BACKGROUND

Various types of devices, display devices, computing and display devices, etc. exist that have one or more cameras for image capture.

SUMMARY

A device can include a processor; memory accessible to the processor; a housing that includes a bezel, a display operatively coupled to the processor, an adjustable extension recess and an adjustable extension extendible outwardly from the bezel and the display; and a camera mountable to the adjustable extension. Various other devices, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
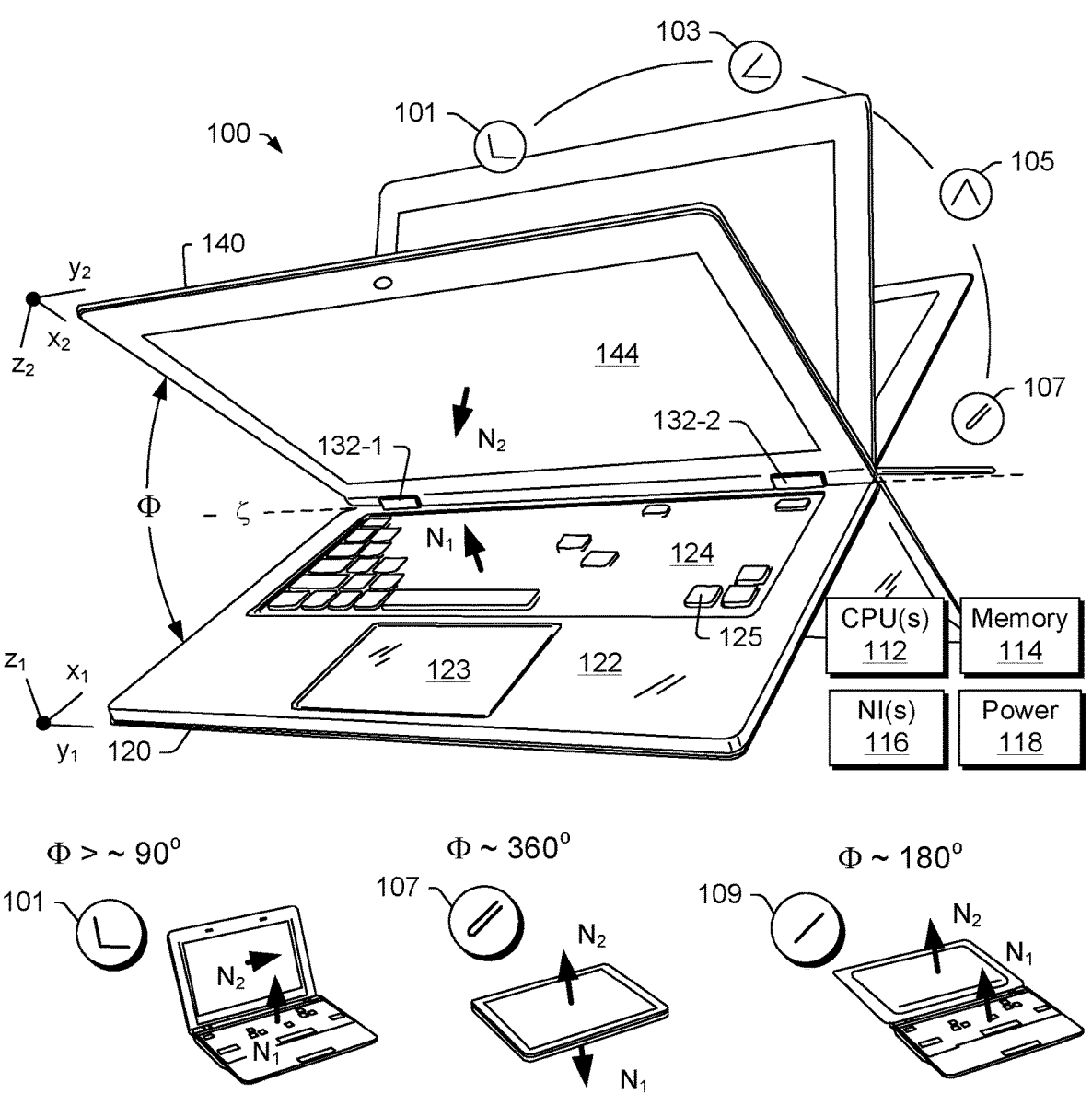
FIG. 1 is a diagram of an example of a device.

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a computing device that may be referred to as a system such as, for example, a computing system (e.g., an information handling device, etc.).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis $\zeta$) and then rotate the keyboard housing such that the keys face the back side of the display in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
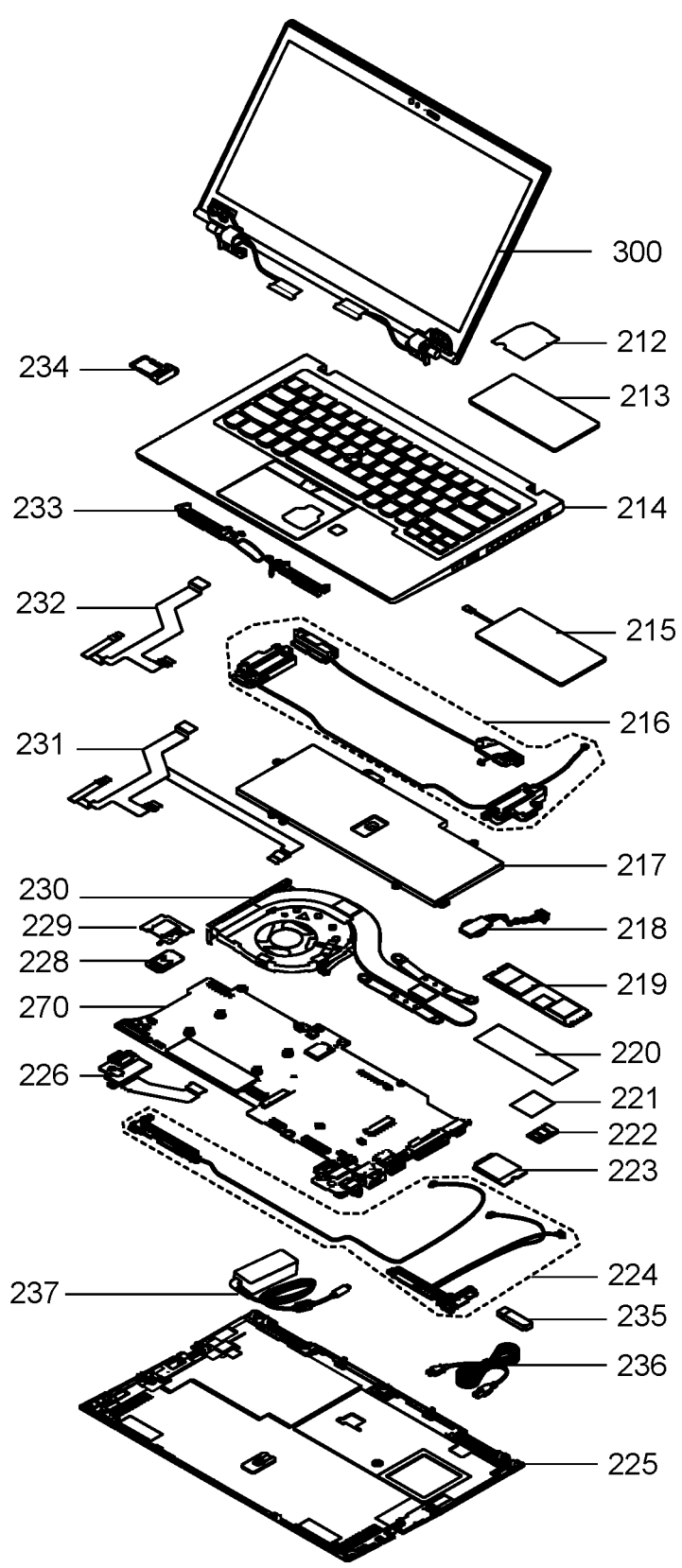
FIG. 2 is a diagram of an example of a computing device.

FIG. 2 shows an exploded perspective view of a computing device 200 as including various components, which can include, for example, a display assembly 300, insulation trackpad tape 212, a trackpad 213 or 215, a keyboard bezel assembly with keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, and an AC power adapter 237.

Figure 3:
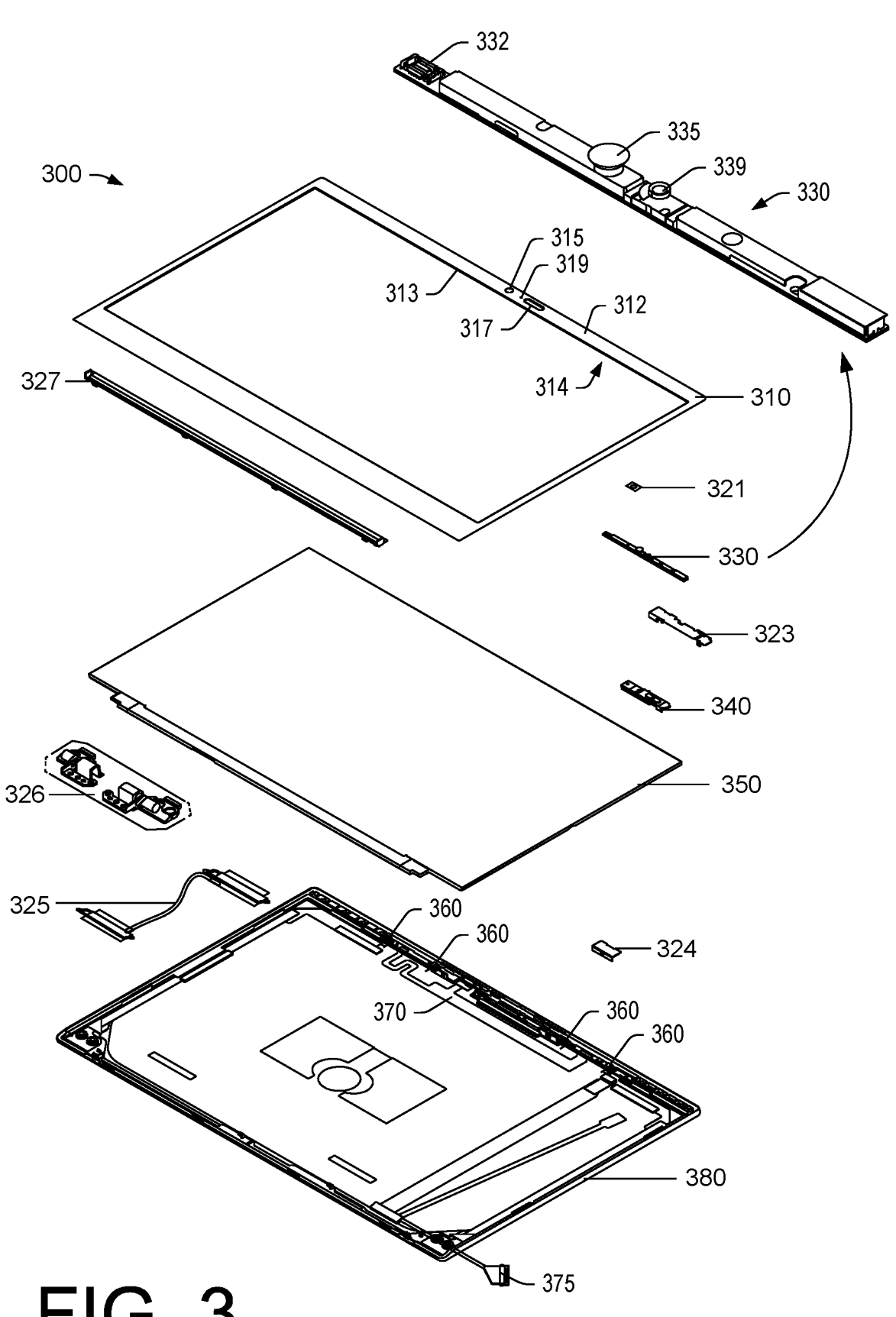
FIG. 3 is a diagram of an example of a display assembly of the computing device of FIG. 2.

FIG. 3 shows an exploded perspective view of the display assembly 300 of FIG. 2 as including various components, which can include, for example, a bezel 310, a foam component for an IR LED camera 321, a camera module 330, a stopper 323, a shutter 340, a display panel 350, a support plate 324, one or more microphones 360, wiring 370, one or more wiring connectors 375, a back side (rear) cover assembly 380, a display cable 325, hinges 326, and a display bezel frame component 327.

In the example of FIG. 2 and FIG. 3, the computing device 200 can include various media capture components. For example, a camera can be a media capture component, a microphone can be a media capture component, etc. A media capture component may be an audio media capture component, a video media capture component, a still image media capture component, etc. As an example, the device 100 of FIG. 1 can include various features of the computing device 200.

As shown, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera module 330 couples to the back side cover assembly 380 where the wiring 370 operatively couples to the camera module 330 and to the one or more microphones 360. The display assembly 300 can be operatively coupled to other circuitry of the computing device 200, for example, via the one or more wiring connectors 375.

In the example of FIG. 3, an enlarged view of the camera module 330 is shown as including a connector 332, a visible camera 335, and an IR camera 339. As explained, the bezel 310 can include a camera opening 315 and an IR camera opening 319, which can be aligned with the cameras 335 and 339 of the camera module 330. In the example of FIG. 3, the connector 332 can be electrically coupled to the wiring 370 where the wiring can be electrically coupled to other circuitry of the computing device 200 (e.g., one or more processors, one or more interfaces, etc.).

Figure 4:
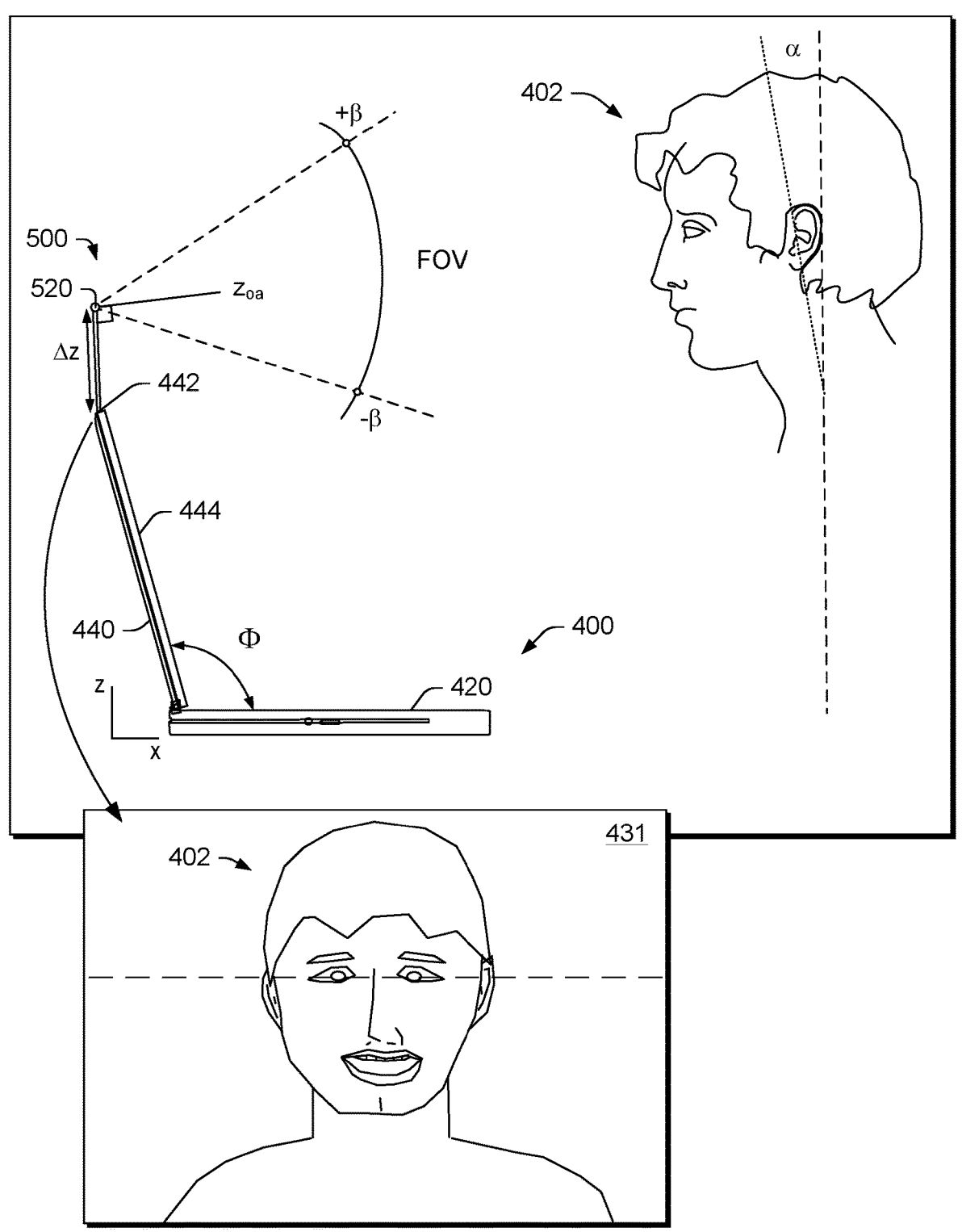
FIG. 4 is a diagram of an example of a device and a user.

FIG. 4 shows an example of a device 400 with respect to a user 402 where the device 400 includes a first housing 420, a second housing 440, and a camera assembly 500, where the camera assembly 500 of the device 400 includes a camera 520 that can provide a field of view (FOV), as represented in an image 431 where the head of the user 402 is captured where the user's eyes are in the upper half of the image 431. In such an example, the user's head is not chopped off at the top or at the bottom and the user's neck is visible along with a portion of the user's shoulders.

In various instances, a user may desire that a captured image be somewhat similar to a portrait image as in portrait photography. In portrait photography, the eyeline is generally in the upper half of a portrait image. In portrait photography, it is generally recommended that a camera be level, or slightly above, the model's eyeline as a view from a low angle may be less flattering. In the example of FIG. 4, as the head of the user 402 is tilted slightly downward, the fact that the FOV of the camera 520 is along an axis pointing upwardly toward the user's eyeline can help to compensate for the camera being below the eyeline of the user 402. As shown, the slight tilt may be referenced with respect to vertical and defined by an angle α, which, in the example of FIG. 4, is approximately 10 degrees.

In the example of FIG. 4, an x, z coordinate system is shown where the x-axis is horizontal and the z-axis is vertical. In the example of FIG. 4, the camera assembly 500 provides for raising the camera 520 above a top side 442 of the housing 440 as indicated by a distance Δz. The distance Δz between the top side 442 and the camera 520 may be adjustable, for example, from about 0.1 cm to 10 cm or more.

As shown in FIG. 4, the second housing 440 includes a display surface 444 that defines a plane where the camera assembly 500 has an optical axis $z_{oa}$ that may be adjustable, for example, it may be adjustable from a position perpendicular to the plane (e.g., a display plane) to another position; noting that the position of the camera 520 can be adjustable such that the camera 520 may be in front of the plane, even with the plane or behind the plane. As an example, where an angle Φ between the housings 420 and 440 changes, the optical axis $z_{oa}$ may be adjustable such that it can be changed to provide a desirable FOV. In such an example, the distance Δz may also be adjusted to provide a desirable FOV. As explained, the camera assembly 500 may provide for multiple degrees of freedom (DOF) such that the camera 520 can provide a desirable FOV.

As shown in FIG. 4, a FOV may be defined using one or more angles, for example, consider the angles +β and −β, which may be equal about the optical axis $z_{oa}$. As an example, a FOV may be characterized by a vertical angle or vertical angles and a horizontal angle or horizontal angles. As an example, a FOV may be characterized by a diagonal dimension, which can pass through an image center. In the example of FIG. 4, a vector aligned with the optical axis $z_{oa}$ can define a distance between an origin of an optical axis and a user, optionally a user's eye or eyes.

Video communication is often utilized in virtual work and virtual home scenarios where people may be more sensitive to their appearance on a video feed. As explained, an elevated camera position can provide for improved appearance via a more appropriate perspective, akin to what a portrait photographer may utilize.

As an example, a camera assembly may be adjustable with respect to distance from a display, for example, as shown in FIG. 4. In such an example, the camera assembly can adjustably position a camera point of view (e.g., a camera, a lens, optical element, etc.) a distance above and outwardly away from a display (e.g., at least vertically away from a display). In such an example, the camera point of view may be more horizontally aligned with eyes of a user (e.g., horizontally leveled, etc.) where the user is being imaged by the camera (e.g., for video communication, etc.). In such an example, a component or components of the camera assembly may be extended and/or retracted manually, semi-automatically or automatically. For example, as to manually, consider a user manipulating the camera assembly with a finger or fingers. As to semi-automatically, consider an example where a user interacts with a computing device via a keyboard, a mouse, a microphone, a visual gesture captured by a camera, etc., for purposes of extending and/or retracting. As to visual gestures, consider a user moving a hand upwardly, pointing upwardly, etc., where image recognition circuitry interprets the visual gesture for adjustments (e.g., extending, retracting, moving to the left, moving to the right, etc.). As to automatically, consider an example where a computing device responds to receipt of a signal (e.g., a communication signal, etc.), responds to opening and/or closing of a clamshell type of computing device, responds to time of day, etc. As an example, a computing device may include one or more electromagnetic movers such as, for example, an electric motor with a stator and a rotor, a linear actuator, etc., which can provide for adjustment of a camera assembly.

As mentioned, a camera assembly that provides for adjustment of a camera point of view can be native to a computing device where it is integrally provided as part of original equipment by a manufacturer.

As an example, an adjustable camera assembly can include one or more hinges, one or more telescoping components, one or more flexible, snake-like components, etc. As an example, in a recessed position of a camera assembly, a housing may be within a framed area (e.g., as defined by a bezel or a frame and corresponding sides); whereas, in an extended position (e.g., deployed position), one or more components of a camera assembly can be positioned a distance outwardly from the housing such as a distance outwardly away from a bezel or a frame. As explained, such a position can be upwardly away such that a user can look more directly into a camera and glance downwardly to see a display with an area that can be defined and/or confined by the bezel or the frame. As an example, in a recessed position, a camera assembly may be flush with a bezel or a frame of a computing device (e.g., a display housing) or it may be recessed, which, in either instance, can facilitate transport, storage, etc., of the computing device with reduced risk of damage to one or more features of the camera assembly (e.g., to preserve component integrity and provide for ease of transport).

As an example, a push-to-eject mechanism may be utilized to transition a camera assembly from a recessed position to an extended position. In such an example, a mechanism such as a click pen may be utilized. In such an example, a user may push the camera assembly into a recess where such a mechanism locks the camera assembly in a recessed position, ready for re-deployment upon a subsequent push-to-eject.

As an example, a camera assembly may be in part positionable via one or more couplings, rails, etc. As an example, a camera assembly may be positionable in a 2D plane or in a 3D space (e.g., depending on particular features, etc.). As explained, a camera assembly may provide for multiple degrees of freedom (DOF) of movement of a camera.

As an example, a camera assembly may be adjustable responsive to one or more types of sensor signals. For example, consider one or more wireless (e.g., BLUETOOTH, etc.) or proximity sensors that may provide for automatic deployment and/or retraction of a camera assembly. In such an example, a camera itself may be utilized for receiving imagery where analysis of the imagery can result in adjustment of a camera assembly (e.g., extending, retracting, positioning, etc.). As an example, a camera assembly may be automatically positionable via circuitry where an aim may be to provide an optimal view of a user (e.g., for a video conference, etc.). In such an example, consider framing a user based on one or more facial and/or head features (e.g., eyes, nose, ears, mouth, etc.). In such an example, a feedback loop may be established that utilizes object and/or feature recognition. In such an example, the feedback loop may provide for reduction of glare. For example, consider glare from a light source (e.g., a light, the sun, reflected light, etc.). In such an example, manual, semi-automatic and/or automatic adjustments may be made.

As an example, a graphical user interface (GUI) may provide for various menus, control graphics, etc., where a user can set various parameters, which may include operational parameters, image parameters, etc. As an example, a GUI may provide for image parameters such as eye position, head fill factor, etc. As to operational parameters, consider one or more parameters that link camera assembly adjustment(s) to a calendar application, a scheduling application, etc. In such an example, a camera assembly may automatically extend responsive to an indication of a meeting that has been scheduled and/or that is impromptu. In such an example, at or slightly before the meeting time, a camera assembly may automatically extend a camera assembly with appropriate positioning to capture imagery of a user such that the user does not have to worry about whether or not image capture will be optimal. In contrast to a fixed camera as may be in a bezel of a display housing, a user may have to adjust the display housing, which may involve positioning via a friction hinge where the display housing is coupled to a keyboard housing. In such an approach, fine adjustments can depend on various factors including an ability to adjust the display housing while applying an amount of friction that is sufficient to overcome hinge friction (e.g., which may involve some back and forth type of movements and jittering of imagery, etc.).

Figure 5:
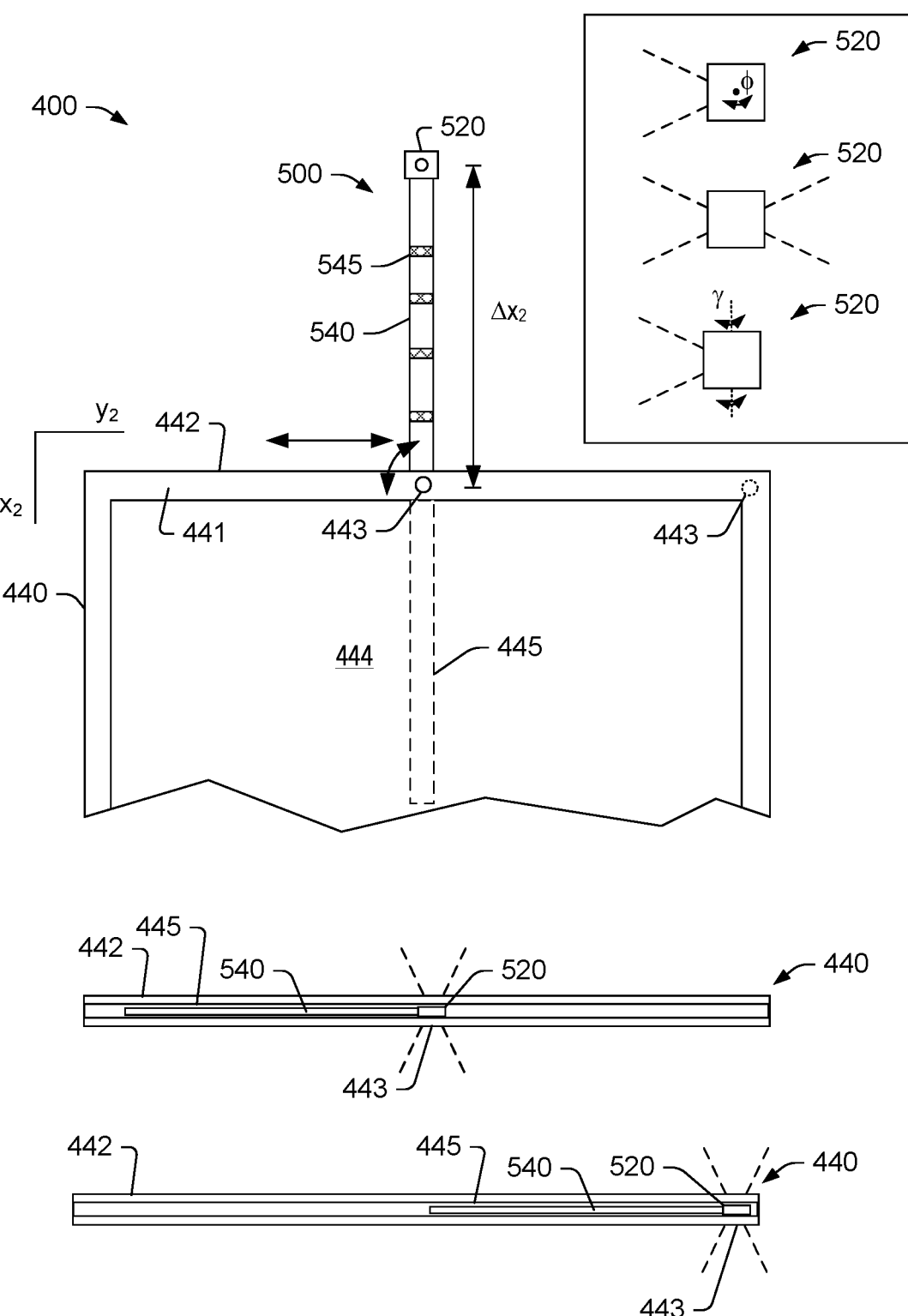
FIG. 5 is a diagram of an example of a device and a user along with example variables.

FIG. 5 shows an example of the device 400, which can include a processor, memory accessible to the processor, a housing 440 that includes a bezel 441, a display 444 operatively coupled to the processor, the camera assembly 500 that includes an adjustable extension 540 extendible outwardly from the bezel 441 and the display 444 and the camera 520 mountable to the adjustable extension 540. In the example of FIG. 5, the housing 440 can include an adjustable extension recess 445, which may be accessible via a top side 442 of the housing 440. For example, consider the adjustable extension recess 445 as being a groove (e.g., a cutout) in the top side 442 of the housing 440.

In the example of FIG. 5, the $x_2$, $y_2$ coordinate system is shown as referred to in FIG. 1. In such a coordinate system, the adjustable extension 540 can provide for extending the camera 520 a distance $\Delta x_2$ beyond the top side 442 of the housing. As an example, one or more distances may be utilized to define a position of the camera 520 (e.g., the distance $\Delta z$, the distance $\Delta x_2$, a distance $\Delta y_2$ (e.g., left or right), a distance $\Delta z_2$ (e.g., into the page or out of the page), etc.). As shown in FIG. 5, the camera 520 may be rotatable about one or more axes (see, e.g., angles $\phi$, and $\gamma$). Such adjustability as to the optical axis of the camera 520 can help to provide a desirable image of a user.

As an example, the adjustable extension recess 445 may extend downwardly from the top side 442 of the housing 440 (see, e.g., FIG. 3 for a space between the back side cover assembly 380 and the display panel 350). As an example, the adjustable extension recess 445 may span a distance between opposing sides of the housing 440 and a distance downward from the top side 442 of the housing 440. For example, consider an ability to slide the camera assembly 500 over a distance along the top side 442 and an ability to slide the camera assembly 500 upwardly or downwardly at a position along the top side 442. In the example of FIG. 5, a vertical arrow (e.g., in an $x_2$ direction) and a horizontal arrow (e.g. in an $y_2$ direction) can indicate possible directions of adjustment of the camera assembly 500. As an example, the camera assembly 500 may be rotatable (e.g., within a common plane of the display 444, etc. and/or about an axis of the adjustable extension 540, etc.).

As an example, the camera assembly 500 can include one or more types of circuitry. For example, consider camera circuitry, microphone circuitry, speaker circuitry, communication circuitry, etc. As an example, camera circuitry may provide for recognition of a user, recognition of one or more visual gestures, etc. As an example, microphone circuitry may provide for recognition of one or more voice commands (e.g., up/down, left/right, etc.). As an example, the adjustable extension 540 can include one or more conductors (e.g., wiring) that can be coupled to wiring such as, for example, the wiring 370 of the example of FIG. 3. As an example, the camera assembly 500 can include one or more features of the camera module 330 of FIG. 3. For example, the adjustable extension 540 can include a connector such as, for example, the connector 332 of FIG. 3. In such an example, wiring may be connected to the camera assembly 500 via the connector where the wiring may be movable, for example, within a space such as a recess of a housing. For example, consider a flexible ribbon cable that can include a connector that mates with a connector of the adjustable extension.

In the example of FIG. 5, the bezel 441 may include one or more openings 443, which can include at least one front side (display side) opening and may include one or more back side openings. As shown, the camera assembly 500 may be disposed in the adjustable extension recess 445 such that the camera 520 can be aligned with at least one of the one or more openings 443. For example, the camera 520 may be aligned with a front side opening, a back side opening or front and back side openings.

As shown in the example of FIG. 5, the camera 520 can be front facing and/or back facing. For example, the camera 520 may be rotatable to face a particular direction and/or be a dual camera with a front facing unit and a back facing unit.

As an example, the camera assembly 500 may be hinged such that it can be rotated from an extended position to a recessed position, optionally being positionable at one or more positions between a vertical extended position and a recessed position, which may be a horizontal recessed position.

As an example, the adjustable extension recess 445 may extend a distance between opposing sides (left and right) of the housing 440. In such an example, the camera assembly 500 may be slidably adjustable side-to-side of the housing 440. For example, consider sliding the camera assembly 500 to the right side, to the center, to the left side, etc., of the top side 442 of the housing 440. As mentioned, a flexible ribbon cable akin to a printer head cable may be utilized to accommodate positions of the camera assembly 500. As an example, one or more electrical interface rails may be included in the adjustable extension recess 445 such that electrical contact is made between the camera assembly 500 and circuitry of the device 400 for a plurality of positions of the camera assembly 500.

As an example, the camera assembly 500 may be detachable from the housing 440. For example, consider an ability to detach the camera assembly 500 where the extension 540 may be utilized as a wand (e.g., a handheld wand, etc.). In such an example, the camera 520 may be operatively coupled to wired and/or wireless circuitry. For example, consider a cable that can be extended and retracted (e.g., via a spring-biased reel, etc.) such that a user can position the camera assembly 500 at a distance from the device 400 (e.g., consider a cable with a length greater than approximately 5 cm and less than approximately 100 cm).

As an example, the camera assembly 500 and/or the housing 440 can include one or more magnets. For example, consider one or more magnets positioned adjacent to the adjustable extension recess 445 where the adjustable extension 540 includes ferromagnetic material such that the adjustable extension 540 can be maintained in a desired position via a magnetic attraction force. As an example, the adjustable extension 540 may include a magnet or magnets (e.g., a permanent magnet or permanent magnets), which may be utilized to maintain a position of the adjustable extension 540 with respect to another magnet or other ferromagnetic material. As mentioned, the camera assembly 500 may be detachable from the device 400, with or without a cable as a tether, where a magnet may be utilized to attach the camera assembly 500 to a ferromagnetic material (e.g., a portion of a desk, a portion of a vehicle, etc.).

As an example, the adjustable extension 540 of the camera assembly 500 may include a series of magnets and/or a series of ferromagnetic materials 545 that can, for example, provide for vertical adjustments of the camera 520 with respect to the top side 442 of the housing 440. In such an example, the camera assembly 500 may be incrementally adjusted with its position being maintained via corresponding magnets and/or other ferromagnetic material of the housing 440. As an example, the housing 440 can include a magnetic rail and/or other ferromagnetic material rail that extends at least in part horizontally between opposing left and right sides of the housing 440. In such an example, the series of magnets and/or ferromagnetic materials 545 may be utilized to maintain a desired position, whether vertical and/or horizontal (see, e.g., arrows).

As an example, the camera assembly 500 may be pen-like in shape where, for example, it may be detached from the device 400 and placed in a pocket (e.g., consider a pocket with a pen slot, etc.). In such an example, a user may continue to utilize the camera 520 when carrying the device 400. In such an example, the camera assembly 500 can include one or more microphones and/or one or more speakers such that audio communication can continue while the camera assembly 500 is out of the adjustable extension recess 445.

Figure 6:
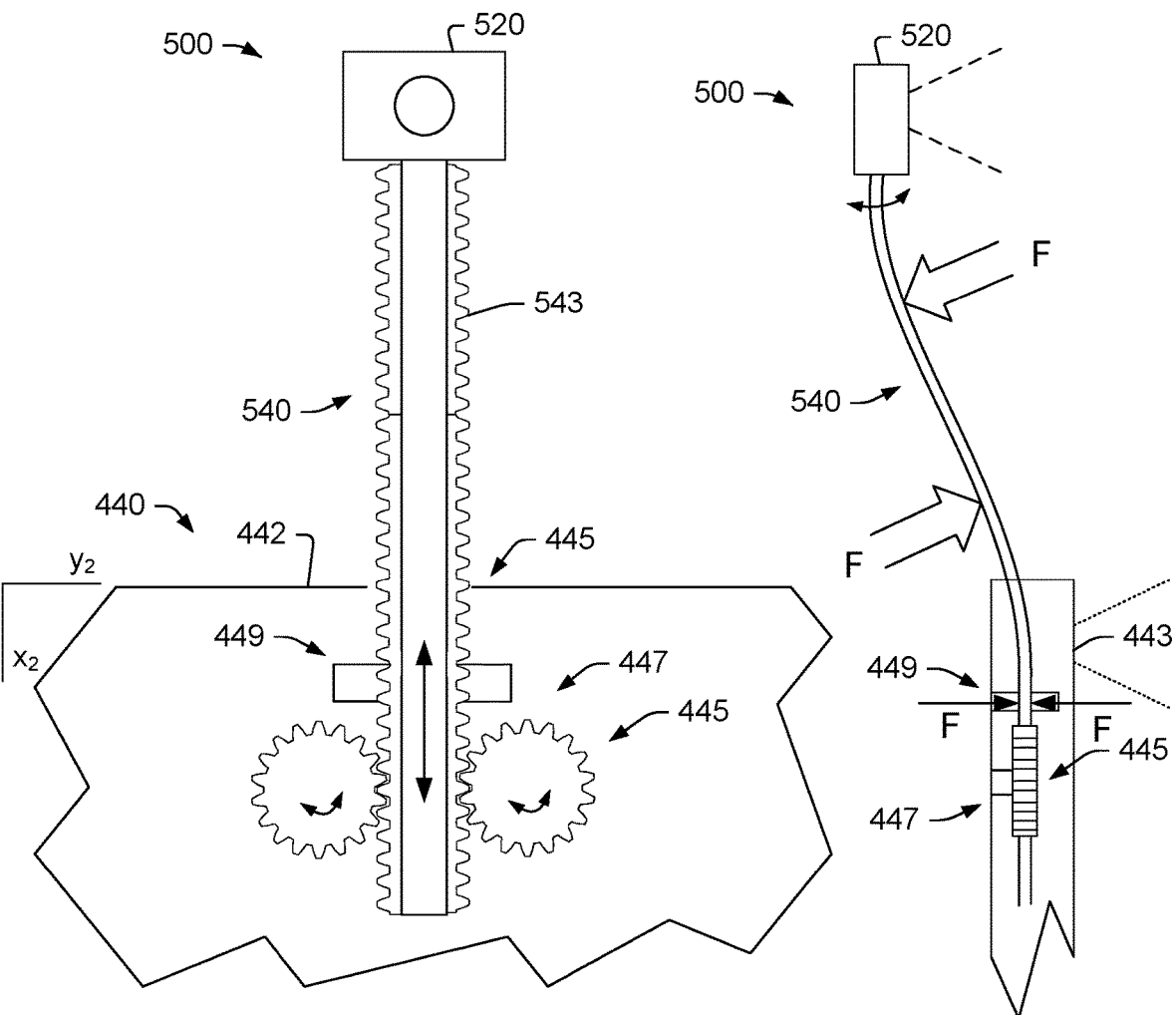
FIG. 6 is a series of diagrams of an example of a device.

FIG. 6 shows an example of the camera assembly 500 with respect to the housing 440 where the adjustable extension 540 can include rack teeth 543 and where the housing 440 can include one or more pinion gears 447 (e.g., with gear teeth) such that a rack and pinion adjustment mechanism provides for positioning of the camera 520. As an example, one or more electromagnetic movers (e.g., an electric motor, etc.) may be coupled to the camera assembly 500 that can drive meshed movements of the rack and pinion adjustment mechanism (e.g., via the rack and/or via the pinion).

As an example, the adjustable extension 540 may be made of a deformable material where force may be applied to shape the adjustable extension 540. For example, the adjustable extension 540 may be made of an elastomeric material that covers one or more metallic, deformable materials (e.g., a plate, plates, a wire, wires, etc.). In such an example, the adjustable extension 540 may be relatively soft to touch and may, for example, insulate one or more electronic components of the camera assembly 500 (e.g., wire, wires, etc.). In the example of FIG. 6, the housing 440 may include one or more force elements (e.g., springs, etc.) 449 that can act to flatten the adjustable extension 540, for example, as it is recessed into the adjustable extension recess 445 of the housing 440. For example, a user may shape the adjustable extension 540 and then forcibly push it into the housing 440 where the one or more force elements 449 act to forcibly straighten the adjustable extension 540 for receipt in the adjustable extension recess 445.

As shown in the example of FIG. 6, the camera 520 may be positioned backwardly (or forwardly) via the deformability of the material of construction of the adjustable extension 540. In such an example, a user may utilize one or more hands to shape the adjustable extension 540. As explained, the adjustable extension 540 may be straightened upon being recessed into the housing 440. In the example of FIG. 6, the camera assembly 500 may be manually adjustable where various features act to guide the adjustable extension 540 into and out of the adjustable extension recess 445. For example, a rack and pinion adjustment mechanism can provide for smooth operation while providing friction sufficient to maintain the camera 520 at a desired position.

Figure 7:
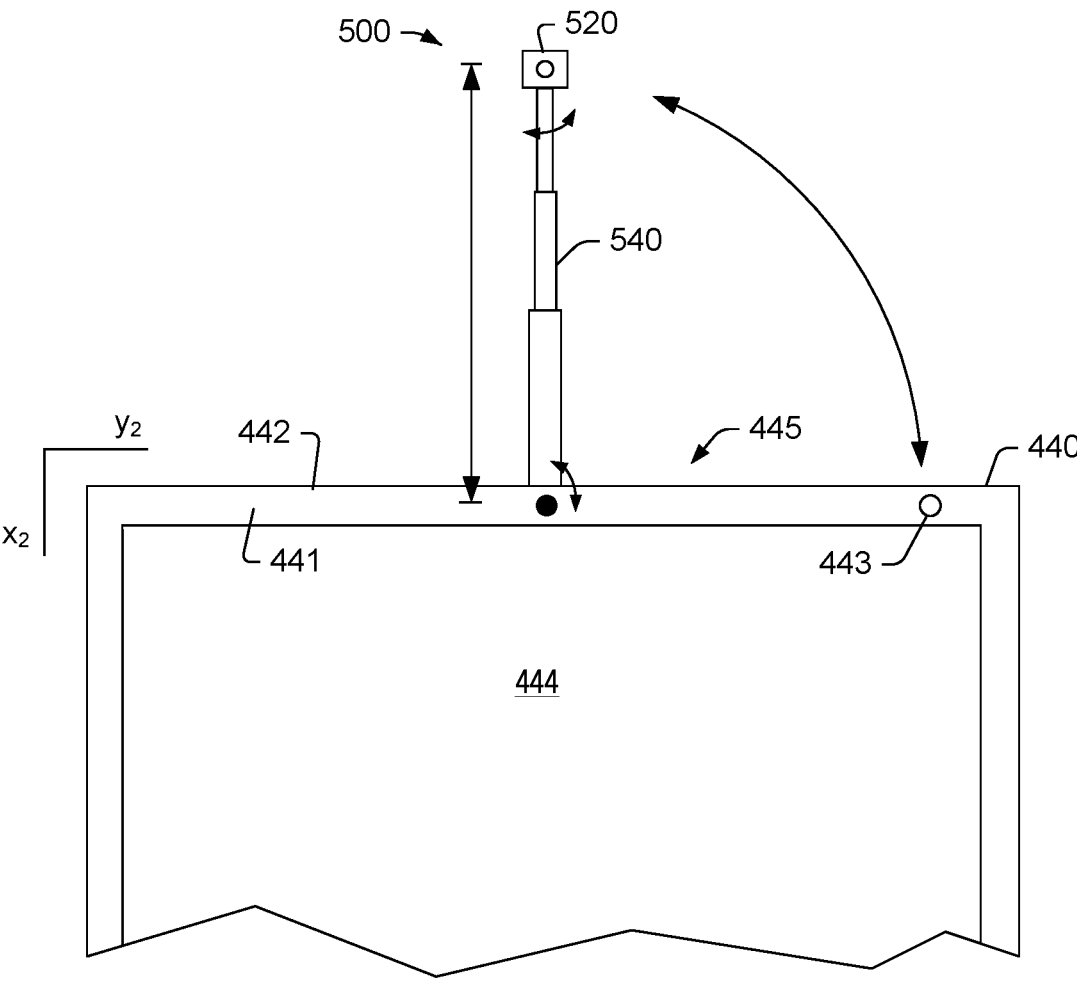
FIG. 7 is a diagram of an example of a device.

FIG. 7 shows an example of the camera assembly 500 with respect to the housing 440 where the adjustable extension 540 includes telescoping components (e.g., nesting hollow cylinders, etc.). In such an example, the adjustable extension 540 may be hinged with respect to the housing 440 such that it can be rotated into and out of the adjustable extension recess 445. As shown in the example of FIG. 7, the opening 443 may be a distance from a hinge axis (see black circle) of the adjustable extension 540 such that, at a particular adjusted position of the telescoping adjustable extension 540, the camera 520 can be aligned with the opening 443 such that the camera 520 may be utilized in a recessed position where the opening 443 is within the bezel 441 of the housing 440. In the example of FIG. 7, a user may vertically and/or rotatably position the camera 520 of the camera assembly 500 with respect to the housing 440.

Figure 8:
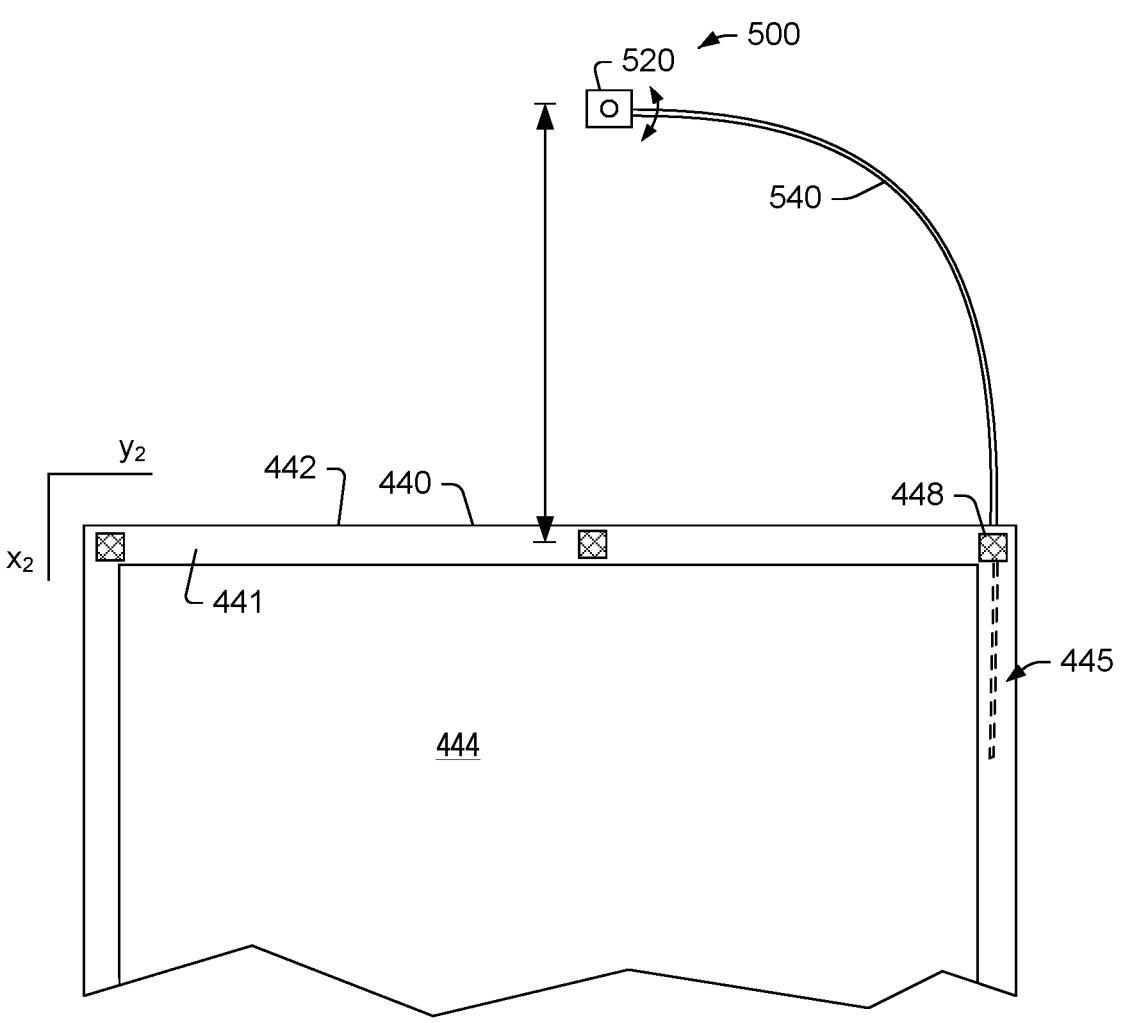
FIG. 8 is a diagram of an example of a device.

FIG. 8 shows an example of the camera assembly 500 with respect to the housing 440 where the adjustable extension 540 can be formed of a deformable material to provide a flexible, positionable snake-like extension. In the example of FIG. 8, a base of the camera assembly 500 may be positionable using, for example, one or more sockets 448, which may include one or more magnets and/or other ferromagnetic material. As an example, the housing 440 may include the adjustable extension recess 445 as being disposed along a side such as a right side and/or a left side of the housing 440. As an example, the one or more sockets 448 can provide for seating of a coupling, which may provide for adjusting the adjustable extension 540 (e.g., via pushing in and pulling out). As an example, such a coupling may be a bushing that is seated in a socket where the adjustable extension 540 passes through the bushing, optionally with an interference fit. For example, consider an interference fit that provide a sufficient amount of force to maintain the adjustable extension 540 in a desired position and that allows for a user to manually push or pull the adjustable extension 540 to recess or extend the adjustable extension 540 (e.g., with respect to the adjustable extension recess 445, etc.).

As shown in the example of FIG. 8, the camera 520 may be swivelable on the adjustable extension 540. For example, consider an axle or axles, a ball socket, etc., that can provide for a desired number of degrees of freedom (DOF) of movement. In such an example, a user may position the camera 520 via the adjustable extension 540 and then adjust the camera 520 on the end of the adjustable extension 540.

Figure 9:
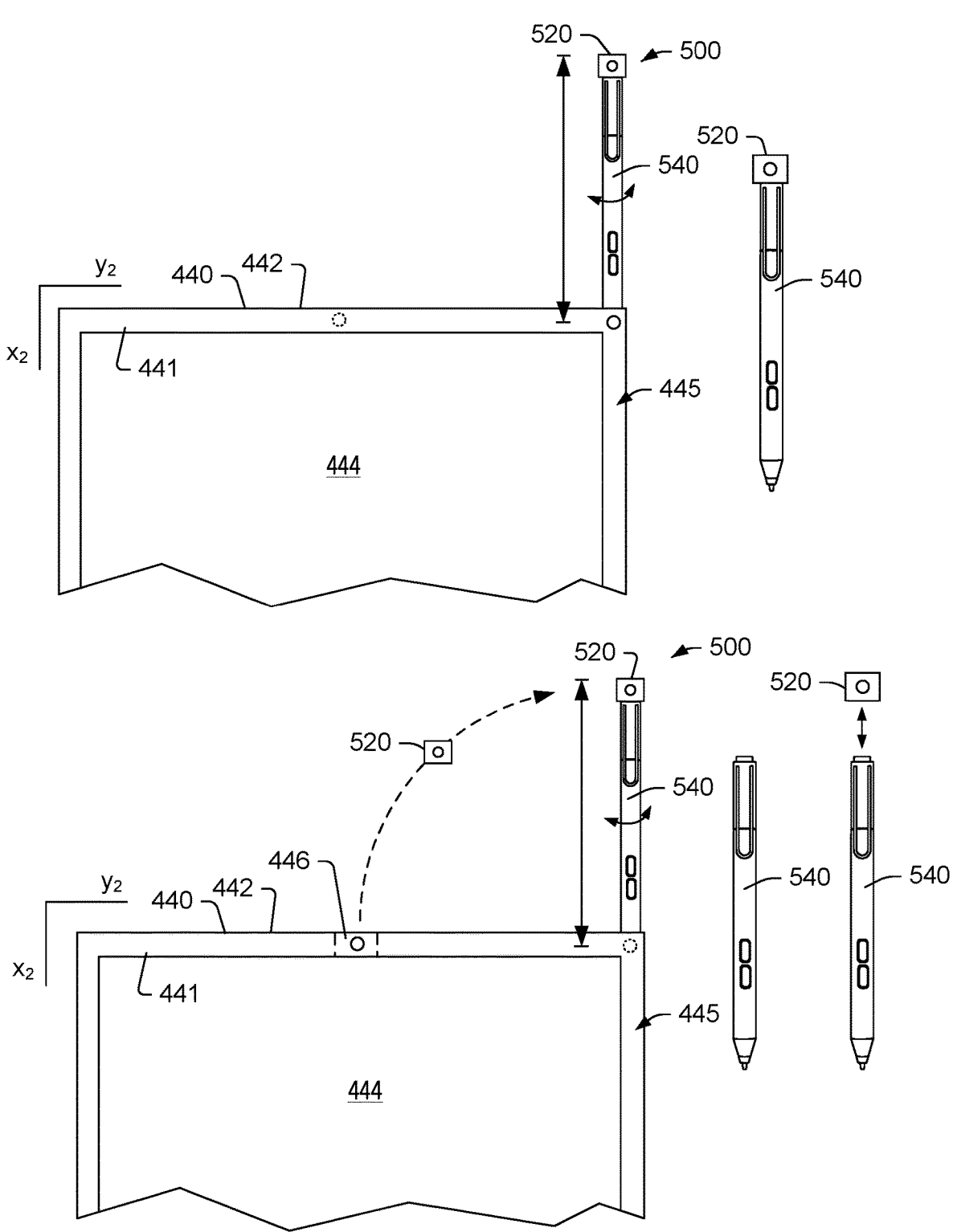
FIG. 9 is a series of diagrams of an example of a device.

FIG. 9 shows an example of the camera assembly 500 with respect to the housing 440. As shown in the example of FIG. 9, the camera assembly 500 can include a stylus shape and stylus functionality. For example, the adjustable extension 540 can be a stylus where the camera 520 couples to the adjustable extension 540, optionally in a detachable, re-attachable manner. For example, the camera 520 may be an integral part of the adjustable extension 540 or may be detachable and re-attachable to the adjustable extension 540. In the example of FIG. 9, at least a portion of the camera assembly 500 is removable from the adjustable extension recess 445 of the housing 440. For example, consider removable for utilization of the camera assembly 500, or a portion thereof, as a stylus (e.g., a passive stylus, an active stylus, etc.). As an example, the display 444 may be a stylus enabled display, which may be via capacitive circuitry, digitizer circuitry, etc.

In the example of FIG. 9, the adjustable extension 540 can be vertically adjustable and may be, for example, rotatable. In such an example, a user may position the adjustable extension 540 and then rotate it and/or rotate a position of the camera 520 as attached to the adjustable extension 540.

As an example, one or more stylus buttons may be utilized for purposes of controlling the camera 520. For example, consider a button that is operatively coupled to circuitry that can cause the camera 520 to capture an image, adjust an exposure (e.g., brightness), turn the camera 520 on or off, etc.

As an example, one or more magnets may be included in the camera assembly 500. For example, consider an ability to attach the camera 520 to the adjustable extension 540 via a magnetic attraction force. As shown in the example of FIG. 9, in a detached state, the camera 520 may be positionable with respect to a camera socket of the housing 440. In such an example, the adjustable extension 540 and the camera 520 may be utilized separately with separate associated functionality (e.g., a camera and a stylus) and be utilized in combination (e.g., a stylus with a camera where the stylus can be the adjustable extension 540).

In the example of FIG. 9, the housing 440 can include circuitry that can provide electrical power to the camera 520 and/or the adjustable extension 540. In such an example, the camera 520 and/or the adjustable extension 540 may include one or more batteries (e.g., one or more rechargeable batteries). In such an example, the camera 520 may be utilized via its own power or via power supplied by the adjustable extension 540.

Figure 10:
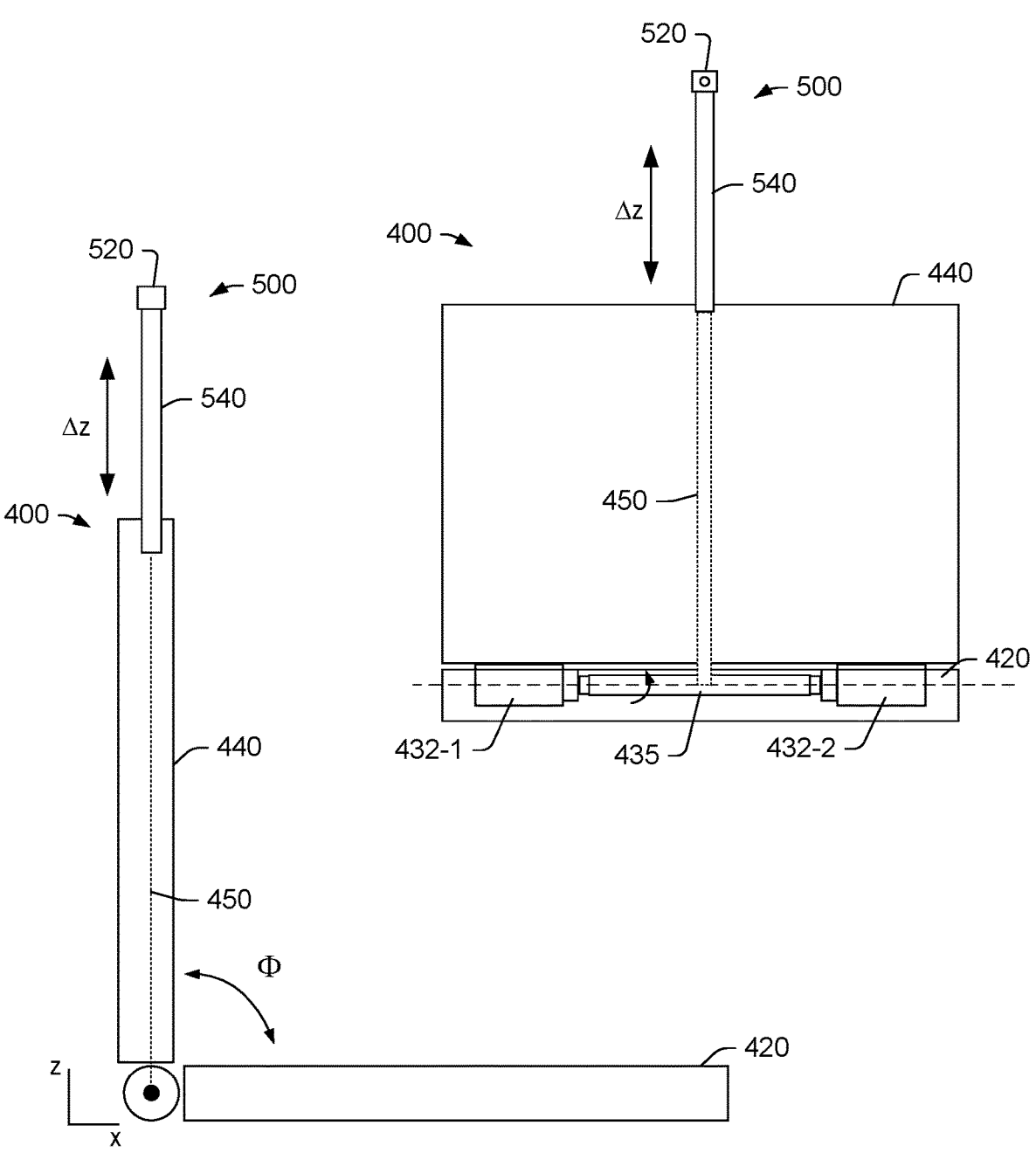
FIG. 10 is a series of diagrams of an example of a device.

FIG. 10 shows an example of the camera assembly 500 with respect to the device 400 where a deployment mechanism can be utilized to automatically extend and recess the camera assembly 500. For example, one or more hinge assemblies 432-1 and 432-2 can be operatively coupled to an axle 435, which may be geared such that an amount of rotation at the one or more hinge assemblies 432-1 and 432-2 can rotate the axle 435 by an increased amount. As shown, the axle 435 can be coupled to a strip 450 that is coupled to the adjustable extension 540 of the camera assembly 500. In such an example, the strip 450 may be taken up and reeled out from the axle 435 in a manner responsive to opening and closing the device 400 (e.g., opening the housing 440 with respect to the housing 420). In such an example, an angle of opening $\Phi$ can correspond to an amount of extension or retraction of the adjustable extension 540 of the camera assembly 500.

As an example, one or more of the hinge assemblies 432-1 and 432-2 may include an electromagnetic mover such as an electric motor with a stator and a rotor or a linear actuator (e.g., a bushing and a rod, etc.). In such an example, the axle 435 may be driven by the electromagnetic mover, optionally independent of the angle of opening $\Phi$. As explained with respect to the example of FIG. 6, an electromagnetic mover may be provided to drive a rack and pinion adjustment mechanism (e.g., or other geared mechanism, etc.).

Figure 11:
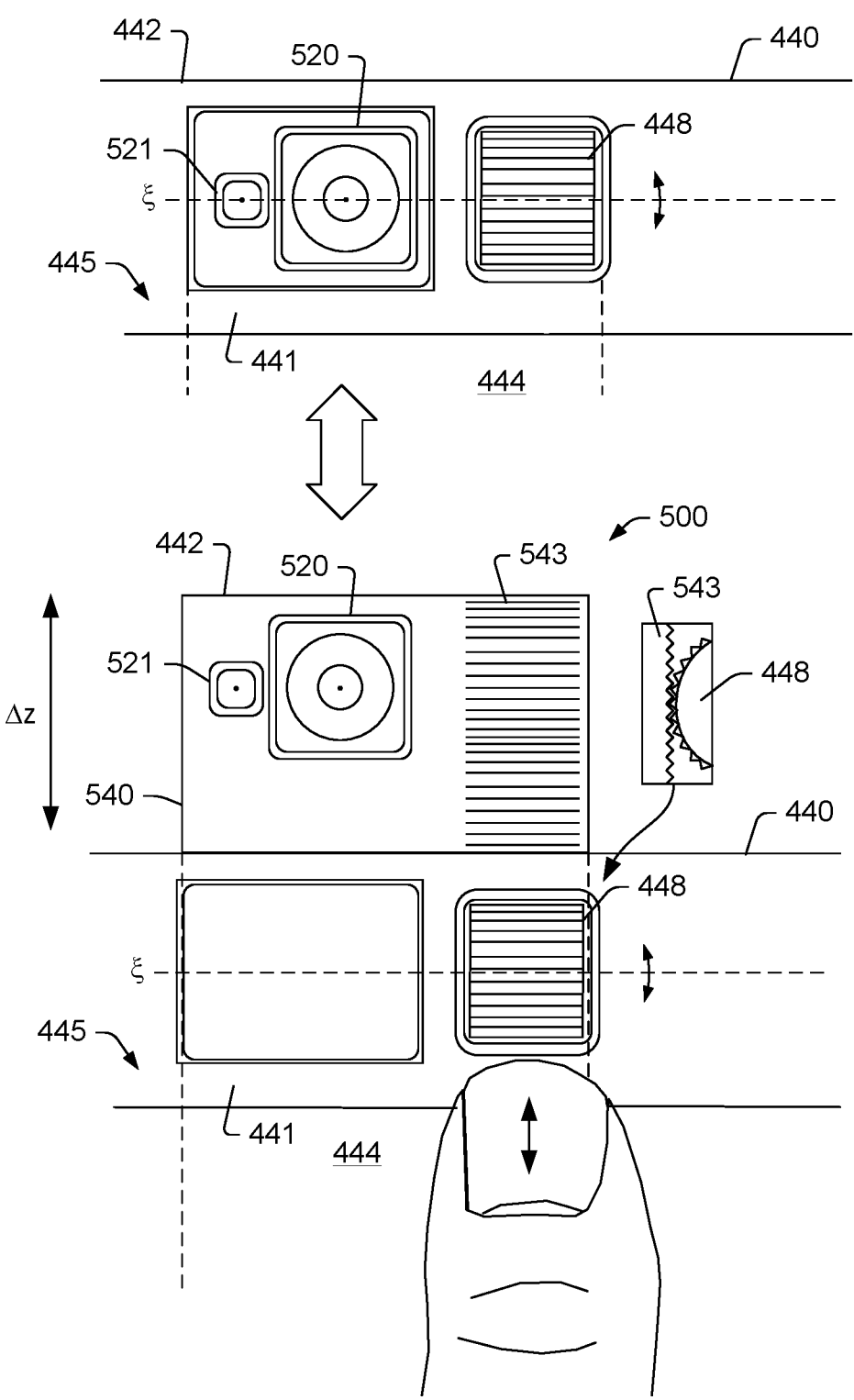
FIG. 11 is a series of diagrams of an example of a device.

FIG. 11 shows an example of the camera assembly 500 with respect to a housing 440 that includes the adjustable extension recess 445. In the example of FIG. 11, the housing 440 includes a roller wheel 448, which may be a knurled wheel with teeth that is rotatable about an axis $\xi$. As an example, the roller wheel 448 may be supported via an axle or axles in bushings where a user can contact the roller wheel 448 with a finger where rotation of the roller wheel 448 can provide for up and down adjustment of the adjustable extension 540 and hence position of the camera 520 (see, e.g., $\Delta z$). In such an example of FIG. 11, another component 521 is also shown, which may be a microphone, an infrared sensor, etc. As explained, the adjustable extension recess 445 can extend a distance into the housing 440 from an edge of the housing 440 (e.g., the top side 442). In the example of FIG. 11, the roller wheel 448 can be in the bezel 441 of the housing 440 and above the display 444. The roller wheel 448 can be textured, finished, etc., such that adequate friction is provided for a user to rotate the roller wheel 448 using a finger such that the user can adjust position of the camera 520.

As explained, a camera assembly may include one or more optical elements such as one or more lenses, mirrors (e.g., or reflective prisms, etc.) that can direct light to a camera of the camera assembly. A camera assembly can include a point of view from which imagery is captured. A point of view may be via one or more optical elements. As an example, a camera assembly can include one or more optical elements that are movable to adjust a point of view.

As an example, an adjustment mechanism can include one or more components, which may include a cable, a connector, a gear, gears, a cam, cams, a magnet, magnets, ferromagnetic material, etc., to provide for appropriate adjustment of an optical axis of a camera responsive to one or more types of mechanical action (e.g., mechanical input). As an example, a magnet can be a permanent magnet or an electromagnet. As an example, an electromagnetic mover may include at least one electrical circuit that can generate at least one magnetic field (e.g., consider at least one electromagnetic field). As an example, an electromagnetic mover may include a solenoid. For example, consider an electromagnetic mechanical assembly that can cause translation of an adjustable extension of a camera assembly responsive to movement of a ferromagnetic plunger disposed at least in part in a coil. As an example, an electromagnetic mover such as a plunger or plungers may be operatively coupled to a ratchet, a gear, or another component. As an example, an electromagnetic mover can be operatively coupled to a sensor, a detector or other circuitry that can issue a signal that can actuate the electromagnetic mover to adjust an adjustable extension of a camera assembly.

As to an electric motor, as an example, it may be a stepper motor that can step according to angular increments responsive to a signal or signals. For example, consider one or more signals generated via one or more of a sensor at one or more hinge assemblies, an accelerometer, a gyroscope or a gravity sensor, etc. As an example, a sensor may detect a rotational position of a hinge component that can relate to an opening angle Φ of a housing.

As an example, a stepper motor can be a relatively small stepper motor such as a stepper motor with a diameter less than approximate 15 mm, less than approximately 10 mm, etc. For example, consider a NetMotion (Livermore, California) series AM 0820 stepper motor that has a diameter of approximately 7.9 mm and a motor length of approximately 13.8 mm. As an example, a stepper motor may be operatively coupled to a gearbox (e.g., a transmission, etc.) to provide for a suitable range of adjustments, which may be for a number of step angles. As an example, a gearbox may reduce a step angle, for example, consider reducing a step angle from 18 degrees for 20 steps about 360 degrees to a step angle of 1 degree, a step angle of 2 degrees, etc. As an example, a gearbox (e.g., a transmission, etc.) may provide a reduction ratio. For example, consider the NetMotion series 08/1 with reduction ratios of 4:1, 16:1, 64:1, 256:1, 1024:1 and 4096:1. Such a gearbox can have a diameter of approximately 10 mm or less, with a body length of approximately 10 mm to 20 mm.

As an example, a system can include one or more shape memory alloy components. For example, consider a shape memory alloy that exhibits a cooling/heating cycle with thermal hysteresis. In such an example, the hysteresis width can depend on a nitinol composition and processing. As an example, consider a temperature range that spans approximately 20 degrees C. to 50 degrees C. (e.g., 36 degrees F. to 90 degrees F.), where it may be reduced or amplified by alloying and/or processing to a suitable range. As an example, a shape memory alloy may be temperature controlled to cause the shape of the shape memory alloy to change in a manner that adjusts an adjustable extension of a camera assembly. As an example, electrical power from a battery or batteries may be utilized to heat an element (e.g., via resistive heating, etc.) such that a shape memory alloy takes on a shape. In such an example, a feedback loop may exist where, for example, a captured image is analyzed for an appropriate view of a user where heating may be utilized to control shape of an adjustable extension and/or other component of a camera assembly.

As explained, the optical axis of a laptop camera can cause a face of a user to be vertically off-center for various reasons, such as, for example, the user tilts the laptop or display housing too far towards herself (or away) or where the base (e.g. keyboard housing) of the laptop is angled due to sitting on the user's lap or being carried. As mentioned, a system can include one or more mechanisms for adjusting an adjustable extension of a camera assembly to provide for a more optimal perspective for image capture of a user.

In various instances, an adjustment to an adjustable extension may provide for glare compensation, unacceptable lighting, etc. For example, consider an automated approach where a captured image can be analyzed for purposes of glare on a user's face, a user's glasses, etc., and/or unacceptable lighting (e.g., front, back, etc.), which may cause rays of light to enter the camera's aperture. In such instances, an automated approach may automatically attempt to adjust an adjustable extension such that quality of a captured image is improved.

Figure 12:
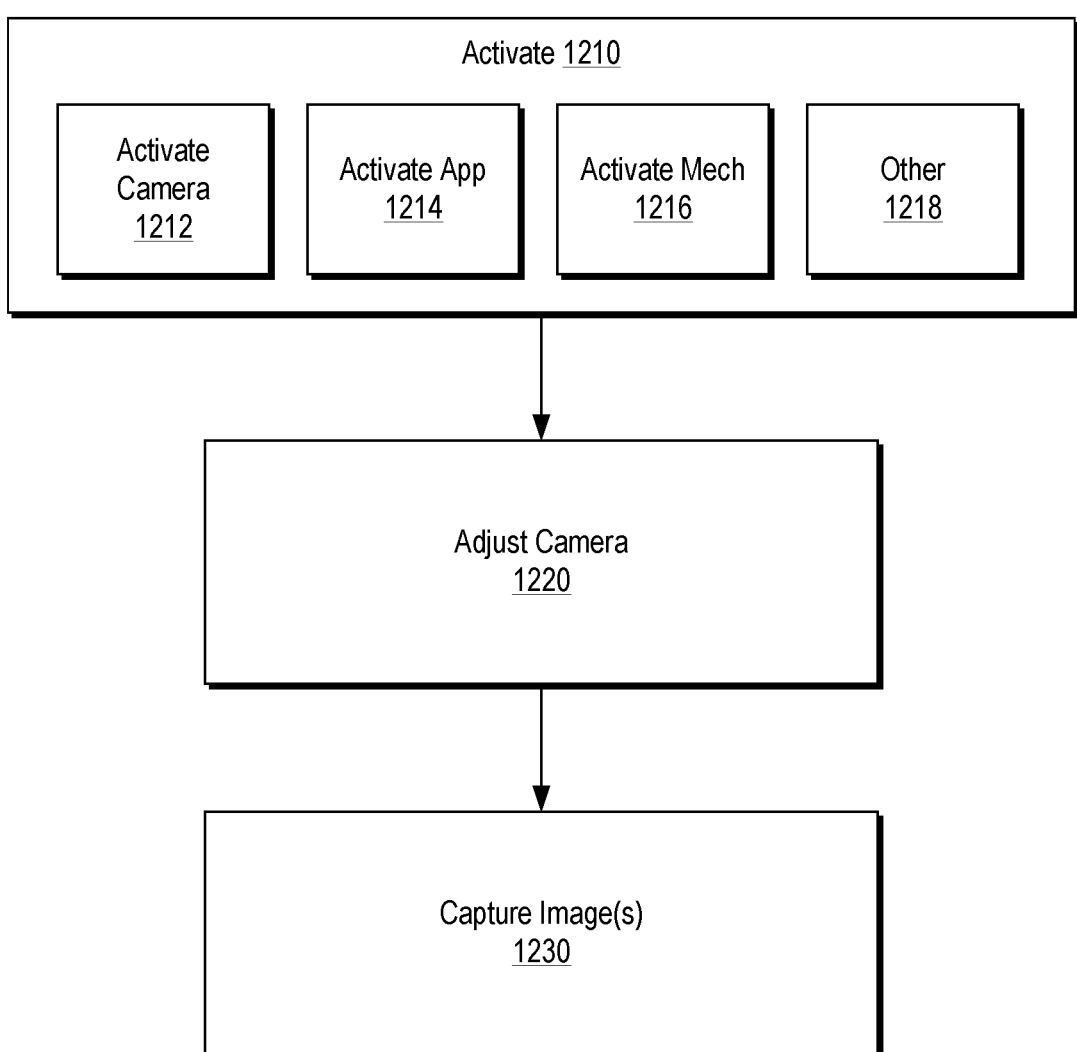
FIG. 12 is a diagram of an example of a method.

FIG. 12 shows an example of a method 1200 that includes an activate block 1210 for activating an adjustment to an optical axis of a camera, an adjustment block 1220 for adjusting an adjustable extension of a camera assembly and a capture block 1230 for capturing one or more images using the camera.

In the example of FIG. 12, the activation block 1210 can include a activate camera block 1212, an activate application block 1214, an activate mechanism block 1216 and/or one or more other activate blocks 1218. As an example, activation may occur responsive to activation of one or more of a camera, an application, a hinge, etc. For example, consider a system that receives an instruction to activate a camera, where such an instruction may cause an adjustment mechanism to become active and, if appropriate, adjust an adjustable extension of a camera assembly. In such an example, the instruction may be responsive to activation of an application, which may include instantiation of an instance of the application, bringing the application forward in a stack of applications, interacting with the application, etc. As to a hinge activation approach, upon detection of a rotational orientation of a housing with respect to another housing, an adjustment mechanism may be activated and, if appropriate, adjust an adjustable extension of a camera assembly.

In the example of FIG. 12, the method 1200 may include making one or more application programming interface (API) calls. For example, upon launching of the videoconferencing application, an API call may be made that wakes up (e.g., activates) an adjustment mechanism, which can include circuitry that can be activated for purposes of making automated adjustments of an adjustable extension of a camera assembly for capturing images for transmission in a videoconferencing session.

Figure 13:
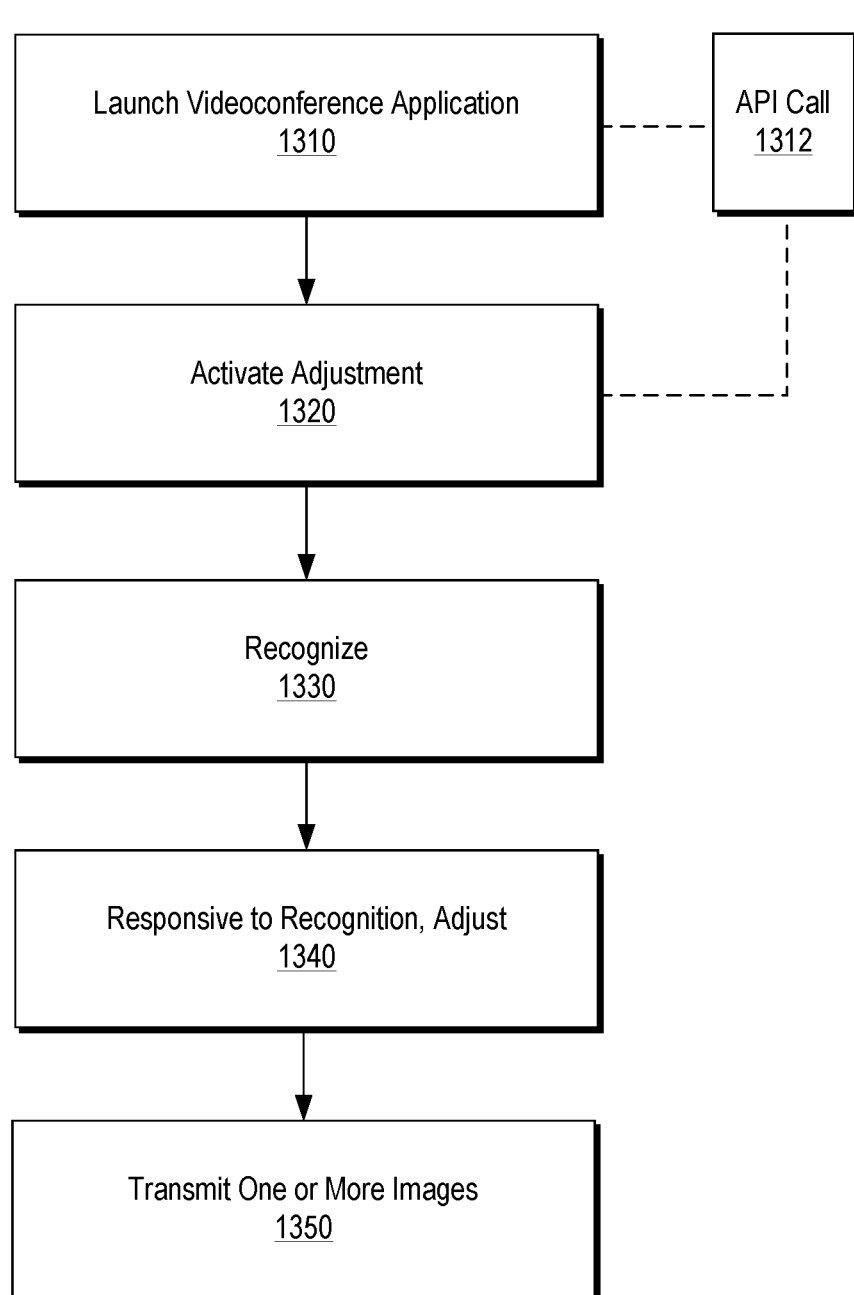
FIG. 13 is a diagram of an example of a method.

FIG. 13 shows an example of a method 1300 that includes a launch block 1310 for launching a videoconferencing application, an activation block 1320 for activating an adjustment mechanism, a recognition block 1330 for recognizing one or more features in imagery (e.g., a face, a gesture, etc.), an adjustment block 1340 for, responsive to the recognition, adjusting an adjustable extension of a camera assembly (e.g., to get a person's head in a FOV of the camera, optionally optimally within the FOV), and a transmission block 1350 for transmitting one or more images captured along the adjusted optical axis of the camera. As shown in the example of FIG. 13, an API block 1312 may be included for purposes of making an API call or API calls and, for example, responsive to such a call or calls, receiving a response or responses (e.g., a confirmation that activation has been achieved and a mechanism is ready for use).

Figure 14:
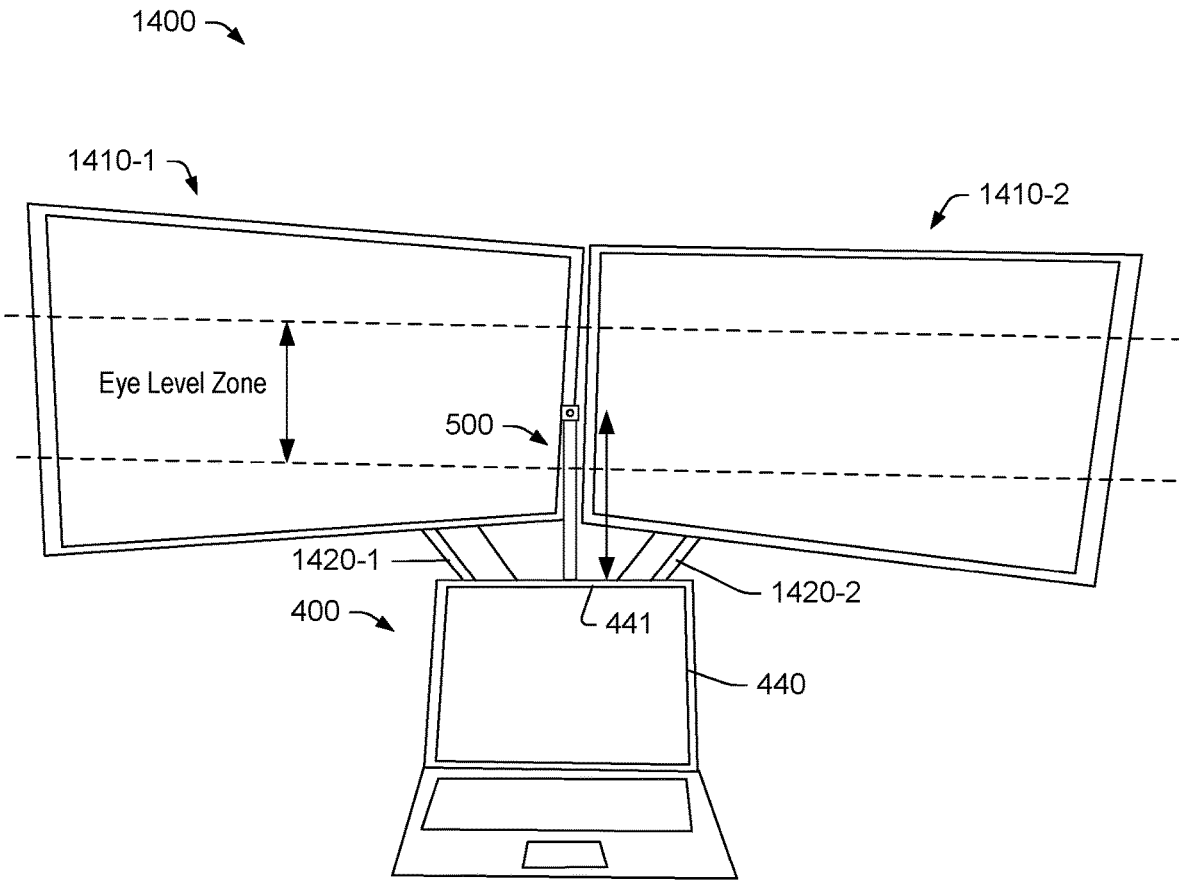
FIG. 14 is a diagram of an example of a system.

FIG. 14 shows an example system 1400 that includes two display devices 1410-1 and 1410-2 that can be supported by a stand or stands 1420-1 and 1420-2 such that the two display devices 1410-1 and 1410-2 are adjacent to each other to effectively form a large display area. In such an example, the device 400 can include the camera assembly 500 where the camera assembly 500 can be deployed such that a point of view is positioned within an eye level zone of a user (e.g., where eye gaze may generally be positioned, etc.). In such an example, the user may participate in a video conference while having his image captured from the point of view, which can provide for a more optimal image of the user (e.g., the user's face, eyes, etc.) compared to an image captured from a point of view of the bezel 441 of the display housing 440 of the device 400. In the example system 1400 of FIG. 14, the device 400 may be utilized with such display devices 1410-1 and 1410-2 where, for example, they are operatively coupled to circuitry of the device 400 (e.g., one or more display connectors, whether wired and/or wireless).

As an example, a device can include a processor; memory accessible to the processor; a housing that includes a bezel, a display operatively coupled to the processor, an adjustable extension recess and an adjustable extension extendible outwardly from the bezel and the display; and a camera mountable to the adjustable extension.

As an example, an adjustable extension can include one or more of telescoping members, a flexible support wire, and stylus circuitry.

As an example, an adjustable extension recess can accommodate a camera, which can be mountable to an adjustable extension.

As an example, a device can include adjustment circuitry. In such an example, such adjustment circuitry can control position of an adjustable extension responsive to imagery captured by the camera. In such an example, imagery can include imagery of a user's head, face, facial feature(s), user gestures (e.g., hand gestures, head gestures, etc.), etc. As an example, adjustment circuitry may control position of an adjustable extension responsive to actuation of a video conferencing application.

As an example, a bezel of a housing can include an opening where a camera is positionable to align an aperture of the camera with the opening.

As an example, an adjustable extension can include a coupling where a housing can include multiple coupling locations. In such an example, each of the multiple coupling locations can include an electrical interface. For example, consider each of the multiple coupling locations as including a portion of a common electrical interface (e.g., a rail, rails, etc.).

As an example, a device can include multiple cameras that may be mountable to an adjustable extension or adjustable extensions. For example, consider first and second cameras, which may face in a common direction, opposite directions (e.g., front and back cameras), etc.

As an example, a device can include an electromagnetic mover operatively coupled to an adjustable extension.

As an example, a device can include a first housing and a second housing and a hinge assembly that couples the first and second housings. For example, consider the first housing being a display housing and the second housing being a keyboard housing. As an example, a device may include multiple display housings. For example, consider a foldable display device, which may include a single foldable display that spans two housings coupled via a hinge assembly.

As an example, an adjustable extension may be operatively coupled to a hinge assembly. In such an example, rotation of a first housing with respect to a second housing via the hinge assembly may provide for adjustment of position of an adjustable extension where a camera is mountable to the adjustable extension.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 15:
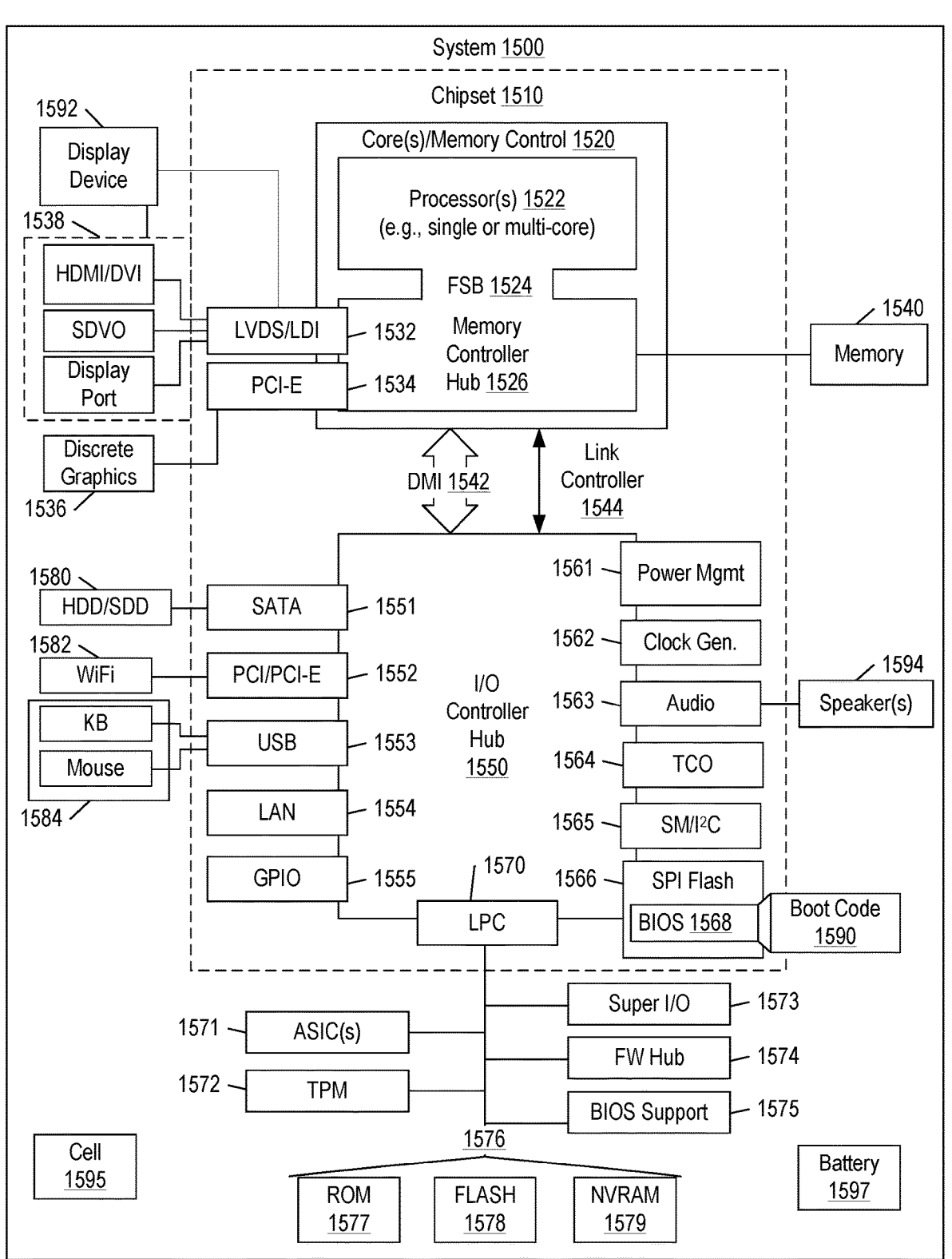
FIG. 15 is a diagram of an example of a system that includes one or more processors.

While various examples of circuits or circuitry have been discussed, FIG. 15 depicts a block diagram of an illustrative computer system 1500. The system 1500 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a device, a system or other machine may include other features or only some of the features of the system 1500. As an example, the device 100, the device 400, etc., may include at least some of the features of the system 1500.

As shown in FIG. 15, the system 1500 includes a so-called chipset 1510. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 15, the chipset 1510 has a particular architecture, which may vary to some extent depending on brand or manufacturer. The architecture of the chipset 1510 includes a core and memory control group 1520 and an I/O controller hub 1550 that exchange information (e.g., data, signals, commands, etc.) via, for example, a direct management interface or direct media interface (DMI) 1542 or a link controller 1544. In the example of FIG. 15, the DMI 1542 is a chip-to-chip interface (sometimes referred to as being a link between a "northbridge" and a "southbridge").

The core and memory control group 1520 include one or more processors 1522 (e.g., single core or multi-core) and a memory controller hub 1526 that exchange information via a front side bus (FSB) 1524. As described herein, various components of the core and memory control group 1520 may be integrated onto a single processor die, for example, to make a chip that supplants the conventional "northbridge" style architecture.

The memory controller hub 1526 interfaces with memory 1540. For example, the memory controller hub 1526 may provide support for DDR SDRAM memory (e.g., DDR, DDR2, DDR3, etc.). In general, the memory 1540 is a type of random-access memory (RAM). It is often referred to as "system memory".

The memory controller hub 1526 further includes a low-voltage differential signaling interface (LVDS) 1532. The LVDS 1532 may be a so-called LVDS Display Interface (LDI) for support of a display device 1592 (e.g., a CRT, a flat panel, a projector, etc.). A block 1538 includes some examples of technologies that may be supported via the LVDS interface 1532 (e.g., serial digital video, HDMI/DVI, display port). The memory controller hub 1526 also includes one or more PCI-express interfaces (PCI-E) 1534, for example, for support of discrete graphics 1536. Discrete graphics using a PCI-E interface has become an alternative approach to an accelerated graphics port (AGP). For example, the memory controller hub 1526 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1550 includes a variety of interfaces. The example of FIG. 15 includes a SATA interface 1551, one or more PCI-E interfaces 1552 (optionally one or more legacy PCI interfaces), one or more USB interfaces 1553, a LAN interface 1554 (more generally a network interface), a general purpose I/O interface (GPIO) 1555, a low-pin count (LPC) interface 1570, a power management interface 1561, a clock generator interface 1562, an audio interface 1563 (e.g., for speakers 1594), a total cost of operation (TCO) interface 1564, a system management bus interface (e.g., a multi-master serial computer bus interface) 1565, and a serial peripheral flash memory/controller interface (SPI Flash) 1566, which, in the example of FIG. 15, includes BIOS 1568 and boot code 1590. With respect to network connections, the I/O hub controller 1550 may include integrated gigabit Ethernet controller lines multiplexed with a PCI-E interface port. Other network features may operate independent of a PCI-E interface.

The interfaces of the I/O hub controller 1550 provide for communication with various devices, networks, etc. For example, the SATA interface 1551 provides for reading, writing or reading and writing information on one or more drives 1580 such as HDDs, SDDs or a combination thereof. The I/O hub controller 1550 may also include an advanced host controller interface (AHCI) to support one or more drives 1580. The PCI-E interface 1552 allows for wireless connections 1582 to devices, networks, etc. The USB interface 1553 provides for input devices 1584 such as keyboards (KB), one or more optical sensors, mice and various other devices (e.g., microphones, cameras, phones, storage, media players, etc.). On or more other types of sensors may optionally rely on the USB interface 1553 or another interface (e.g., I²C, etc.). As to microphones, the system 1500 of FIG. 15 may include hardware (e.g., audio card) appropriately configured for receipt of sound (e.g., user voice, ambient sound, etc.).

In the example of FIG. 15, the LPC interface 1570 provides for use of one or more ASICs 1571, a trusted platform module (TPM) 1572, a super I/O 1573, a firmware hub 1574, BIOS support 1575 as well as various types of memory 1576 such as ROM 1577, Flash 1578, and non-volatile RAM (NVRAM) 1579. With respect to the TPM 1572, this module may be in the form of a chip that can be used to authenticate software and hardware devices. For example, a TPM may be capable of performing platform authentication and may be used to verify that a system seeking access is the expected system.

The system 1500, upon power on, may be configured to execute boot code 1590 for the BIOS 1568, as stored within the SPI Flash 1566, and thereafter processes data under the control of one or more operating systems and application software (e.g., stored in system memory 1540). An operating system may be stored in any of a variety of locations and accessed, for example, according to instructions of the BIOS 1568. Again, as described herein, a satellite, a base, a server or other machine may include fewer or more features than shown in the system 1500 of FIG. 15. Further, the system 1500 of FIG. 15 is shown as optionally include cell phone circuitry 1595, which may include GSM, CDMA, etc., types of circuitry configured for coordinated operation with one or more of the other features of the system 1500. Also shown in FIG. 15 is battery circuitry 1597, which may provide one or more battery, power, etc., associated features (e.g., optionally to instruct one or more other components of the system 1500). As an example, a SMBus may be operable via a LPC (see, e.g., the LPC interface 1570), via an I²C interface (see, e.g., the SM/I²C interface 1565), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising: a processor; memory accessible to the processor; a housing that comprises a bezel, a display operatively coupled to the processor, an adjustable extension recess and an adjustable extension extendible outwardly from the bezel and the display; and a camera mountable to the adjustable extension, wherein the adjustable extension recess accommodates the camera.

2. The device of claim 1, wherein the adjustable extension comprises telescoping members.

3. The device of claim 1, wherein the adjustable extension comprises a flexible support wire.

4. The device of claim 1, wherein the adjustable extension comprises stylus circuitry.

5. The device of claim 1, comprising adjustment circuitry.

6. The device of claim 5, wherein the adjustment circuitry controls position of the adjustable extension responsive to imagery captured by the camera.

7. The device of claim 5, wherein the adjustment circuitry controls position of the adjustable extension responsive to actuation of a video conferencing application.

8. The device of claim 1, wherein the bezel comprises an opening and wherein the camera is positionable to align an aperture of the camera with the opening.

9. The device of claim 1, wherein the adjustable extension comprises a coupling and wherein the housing comprises multiple coupling locations.

10. The device of claim 9, wherein each of the multiple coupling locations comprises an electrical interface.

11. The device of claim 9, wherein each of the multiple coupling locations comprises a portion of a common electrical interface.

12. The device of claim 1, wherein the camera comprises a first camera and further comprising a second camera.

13. The device of claim 12, wherein the second camera is mountable to the adjustable extension.

14. The device of claim 12, wherein the first and second cameras face in opposite directions.

15. The device of claim 1, comprising an electromagnetic mover operatively coupled to the adjustable extension.

16. The device of claim 1, wherein the housing is a first housing and further comprising a second housing and a hinge assembly that couples the first and second housings.

17. The device of claim 16, wherein the second housing comprises a keyboard.

18. The device of claim 16, wherein the adjustable extension is operatively coupled to the hinge assembly.

19. The device of claim 18, wherein rotation of the first housing with respect to the second housing via the hinge assembly adjusts position of the adjustable extension.

* * * * *